United States Patent
Tamcsin

(10) Patent No.: US 7,343,831 B1
(45) Date of Patent: Mar. 18, 2008

(54) ADJUSTABLE MOTORCYCLE HANDLEBAR ASSEMBLY

(76) Inventor: Timothy A. Tamcsin, 275 E. Fourth St., Suite 750, Saint Paul, MN (US) 55101

( * ) Notice: Subject to any disclaimer, the term of this patent is extended or adjusted under 35 U.S.C. 154(b) by 149 days.

(21) Appl. No.: 10/733,539

(22) Filed: Dec. 11, 2003

(51) Int. Cl.
*B62K 21/12* (2006.01)

(52) U.S. Cl. ............ 74/551.1; 403/196; 403/385; 403/396; 280/279

(58) Field of Classification Search ........... 280/274, 280/276–280; 74/551.1, 482, 551.3; 403/289, 403/290, 385, 386, 389, 391, 396, 398, 399, 403/298, 177, 191, 196
See application file for complete search history.

(56) References Cited

U.S. PATENT DOCUMENTS

| | | | | |
|---|---|---|---|---|
| D320,548 | S | * | 10/1991 | Blatt ............................ D8/396 |
| 5,290,052 | A | * | 3/1994 | Bontrager .................... 280/279 |
| 5,570,614 | A | * | 11/1996 | Nastrucci .................... 74/551.1 |
| 5,603,521 | A | * | 2/1997 | Bontrager .................... 280/279 |
| 5,899,117 | A | * | 5/1999 | Newkirk ..................... 74/551.8 |
| 5,931,049 | A | * | 8/1999 | Tsai ............................ 74/551.3 |
| 6,010,140 | A | * | 1/2000 | Guynn ........................ 280/291 |
| 6,073,977 | A | * | 6/2000 | Schmidt-Hansen et al. . 285/373 |
| 6,325,402 | B1 | * | 12/2001 | Gogo et al. ................. 280/279 |
| 6,331,089 | B1 | * | 12/2001 | Iteya ........................... 403/56 |
| 6,394,694 | B1 | * | 5/2002 | Klieber ........................ 403/391 |
| 6,578,652 | B1 | * | 6/2003 | Kobacker et al. ........... 180/219 |
| 6,662,680 | B2 | * | 12/2003 | Rocket ....................... 74/551.3 |
| 6,712,541 | B1 | * | 3/2004 | Henricksen ................. 403/344 |
| 2002/0108465 | A1 | * | 8/2002 | Rocket ....................... 74/551.1 |

FOREIGN PATENT DOCUMENTS

EP 0388540 * 9/1990

OTHER PUBLICATIONS

Two Brothers Racing Catalog, p. 77, Copyright 2002.

* cited by examiner

*Primary Examiner*—Daniel P. Stodola
*Assistant Examiner*—Daniel J. Mills
(74) *Attorney, Agent, or Firm*—Steven E. Kahm; Nikolai & Mersereau, P.A.

(57) ABSTRACT

A clamp kit for motorcycles permitting a wide range of handlebar positions to fit the size of the rider, the comfort of the rider, or to change the riding style of the motorcycle. The clamp has two split rings, one for attaching to the fork tube of the motorcycle and one for accepting a handlebar. The clamp is rotatable to various positions on the fork tube to position the handlebar in a position, which is comfortable for the rider and does not interfere with the frame or component parts of the motorcycle. The height of the handlebars and the angle of the handlebars are easily adjustable by use of the second split ring on the clamp. The handlebars are spread apart and can rotate in case of an accident to improve motorcycle safety.

3 Claims, 5 Drawing Sheets

ADJUSTABLE MOTORCYCLE HANDLEBAR ASSEMBLY

BACKGROUND OF THE INVENTION

1. Field of the Invention

This invention relates to motorcycles and more particularly to a handlebar conversion kit for motorcycles. The invention allows the position of handlebars to be quickly, easily, changed over a large range of positions to fit the rider or to change the riding position to suit the desired riding style.

2. Description of the Related Art

Street motorcycles come in five basic styles; sport, sport touring, standard, cruiser, and touring. The style of these bikes is simply a description of the type of riding position or riding style that they offer. When you purchase a motorcycle, essentially, you purchase a riding position. Typically the manufacture of a motorcycle will design a handlebar system that will generally fit most people, however many people of different sizes purchase these same motorcycles with virtually no way of changing the position of the handlebars to suit their size or personal preference. In an effort to offer a product to solve this problem, various handlebars and "riser" kits are offered in the marketplace. These handlebars and risers kits however, are designed to be a permanent or semi permanent change, allowing only very limited adjustability, therefore severely limiting the ability of the rider to customize their riding position, change the fit of their motorcycle, and or change their riding style. The disadvantage of the prior art handlebars and risers is that they offer only a very limited range of travel and again lock the rider into one riding position. The prior art is severely limited in its ability to make quick and large travel movement changes in the handlebar position because until now, an adequate design had not been developed. A further disadvantage of the prior art kits discussed above, is that the various components are often welded or fixed therefore the handlebars will "dig in" or snap off in the event of an accident, and serve as a fulcrum causing the motorcycle to flip, exacerbating the extent of injuries incurred by the rider. Worse yet, the design of prior art handlebar kits can cause injuries when such injuries would not otherwise occur.

SUMMARY OF THE INVENTION

The motorcycle handlebar assembly of the present invention includes two clamps and two handlebars. One clamp is attached to each of the fork tubes of the motorcycle. Each clamp comprises a block of metal having a double split ring. The first split ring is used to secure the clamp to the fork tube and the second split ring is used to secure a handlebar to the clamp. The first split ring is infinitely adjustable both in terms of height and rotation relative to the fork tube. Likewise, the second split ring permits similar adjustment of the height and rotation of the handlebar relative to the clamp. These two split rings allow independent movement of both the handlebar and fork inside their respective split rings. The split rings are tightened or loosened on the fork tubes or handlebars by a bolt extending though posts held in apertures in a locking portion of the split rings. The clamps permit the handlebars to be quickly and easily adjusted over a large range of travel in height, rotational angle relative to the fork tube, and towards and away from the rider.

The design of the adjustable handlebar assembly is such that it can generally be installed without the need to remove the cowling or windscreen. Once installed, the adjustable handlebar assembly of the present invention permits quick and easy adjustment. The adjustable motorcycle handlebar assembly can be used on many kinds of motorcycles to provide a wide range of handlebar positions. On a standard, sport touring, or sport bike, the invention can also be used to convert the motorcycle riding style from a sports bike style to a touring bike style and back again. For example, to change to a touring riding position from a sport bike position, the handlebars can be positioned higher, further back and wider to allow the rider to sit upright with the handlebars in easy reach. The upright posture is more comfortable for the rider and contributes to safety, as the wider position allows for easier control. Further the rider's head is upright for better observation of the road and traffic conditions. The design of the clamp generally permits the handlebars to be placed in such a way that there is little likelihood of contact or interference with the windscreen or cowling allowing full controllability as designed by the manufacture, and changing the adjustable motorcycle handlebar assembly back to the stock setting is just as easy and fast. Also, in the event of an accident, the invention will allow the handlebars to safely collapse so they will not snap off or act as a fulcrum, which can cause the motorcycle to tumble and injure the rider.

OBJECTS OF THE INVENTION

One object of the present invention is to provide an adjustable handlebar assembly for quickly and easily permitting customized positions of handlebars in order to better fit the rider or to change the riding position.

A further object of the invention is to provide an adjustable handlebar assembly that can collapse in an accident to reduce the risk of injury.

It is another object of the invention to provide a universally applicable handlebar system to fit virtually any motorcycle.

Still another object of the invention is to provide an adjustable handlebar assembly that can be installed on a motorcycle quickly and easily.

Another object of the invention is to be able to position the handlebars in a wide range of positions and still allow the full range of steering motion as designed by the manufacture of the motorcycle with little or no interference.

It is an object of the invention to increase the safety of riding motorcycles.

Still another object of the invention is to improve the comfort and fit of the motorcycle to the rider.

An additional object of the invention is to allow the user to convert a sports bike style riding position to a touring style riding position and back again easily and quickly.

A further object of the invention is to provide an adjustable handlebar assembly having a clamp that is infinitely adjustable in terms of height, rotation, and fore and aft position ability relative to the fork tube of the motorcycle.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
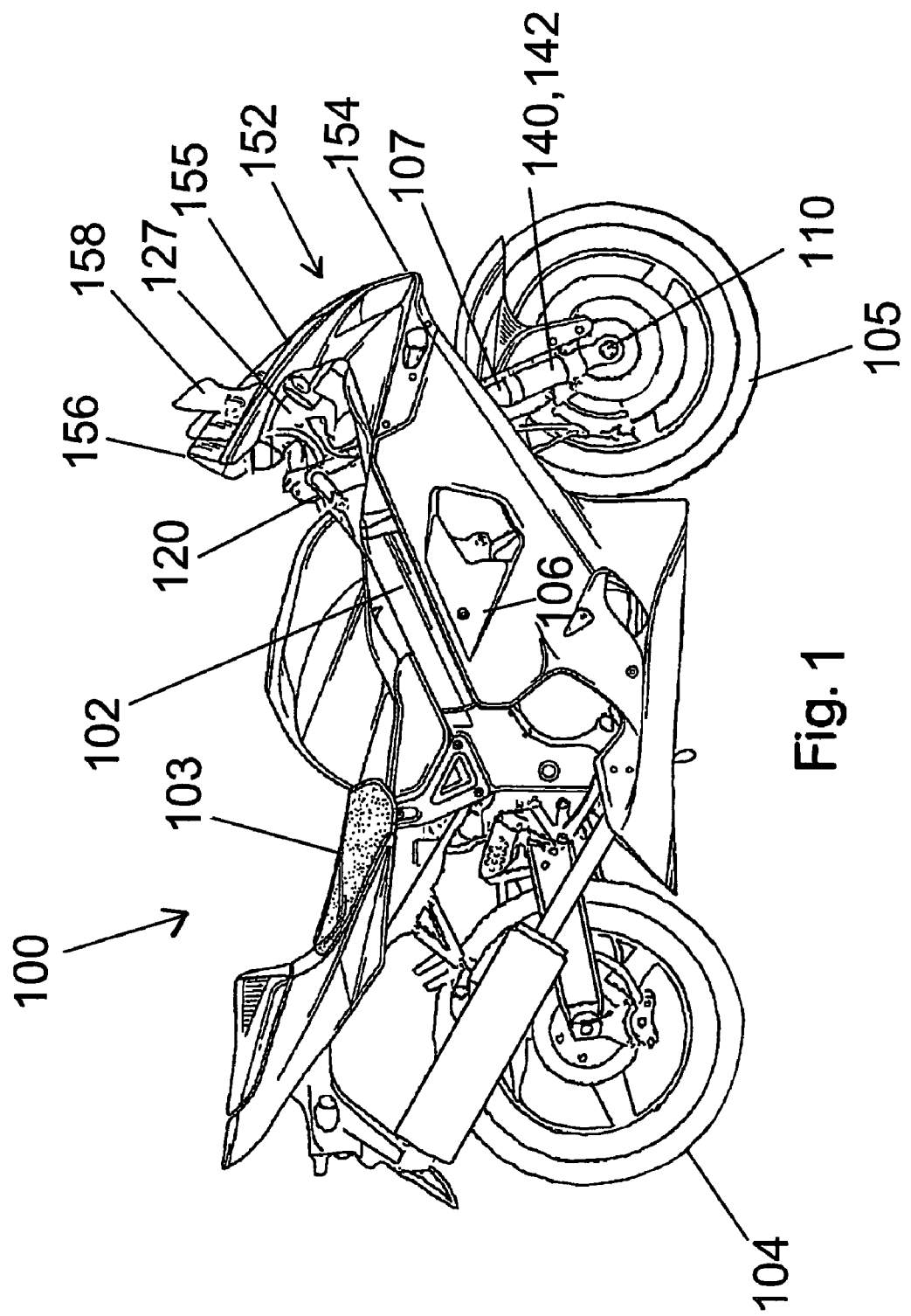
FIG. 1 is a perspective view of a sports bike style motorcycle.

FIG. 1 shows a sports bike style motorcycle 100. The motorcycle includes a frame 102, a seat 103, a rear wheel 104, and front wheel 105, an engine 106, for powering the rear wheel, 104 and a fork 107 pivotally connected to the frame 102. The fork 107 includes a pair of fork tubes 140, 142. The front wheel 105 of the motorcycle 100 is attached to the fork tubes 140, 142 by axle 110. The factory installed handlebars 120 are mounted to the fork tubes 140, 142 or the top triple clamp (not shown) and are used to steer the motorcycle. A variety of actuators are mounted on the handlebars. These typically include a throttle for controlling the speed, a clutch lever, brake levers, and turn signals. In some models of motorcycles, such as the one shown in FIG. 1, there is a fork 107 with a cowl 152 mounted thereon. The cowl 152 may include a lower section 153 that projects forward from the fork 107, a bull nose section 154 and a swept back section 155 that holds the windscreen 156. The swept back section 155 of the cowl 152 and the windscreen 156 extend back over the handlebars 120. The cowl 152 may have right and left sides each having a cut out portion 127. The handlebars 120 extend from fork 107 through the cut out portion 127 of cowl 152 and past the sides of the cowl 152. The mirrors 158 of the motorcycle typically extend from the cowl 152 above the handlebars 120. The handlebars 120 are moved to turn the fork 107. This turning motion is imparted to the front wheel 105 to help steer the motorcycle 100.

The present invention provides an adjustable handlebar assembly 200. While the adjustable handlebar assembly 200 can be installed at the factory, it can also replace traditional factory installed handlebars 120. The adjustable handlebar assembly 200 includes a pair of clamps 10 and a pair of handlebars 20.

Figure 2:
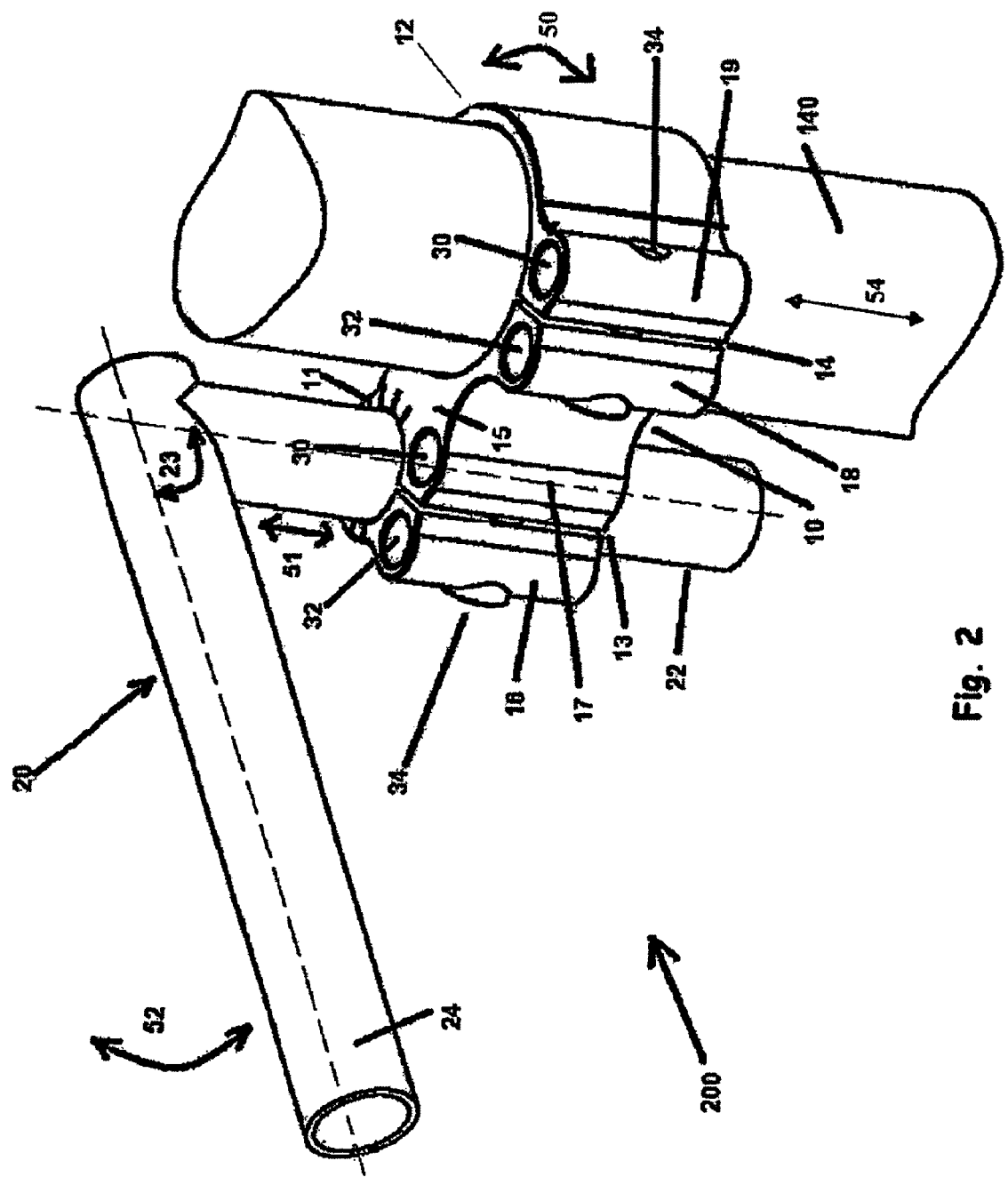
FIG. 2 is a top rear perspective view of the clamp for a motorcycle handlebar with the handlebar installed.

As shown in FIG. 2 one clamp 10 is attached to fork tube 140. The other clamp 10 is attached to fork tube 142. Clamps 10 are used to mount handlebars 20 to the fork tubes 140, 142. A significant aspect of the present invention is that the height and the rotation of the clamps 10 are both infinitely adjustable within a given range with respect to the associated fork tubes 140, 142. Likewise, the handlebars 20 are both infinitely adjustable within a given range with respect to the associated clamp 10.

Another important aspect of the design is that the handlebars 20 can move in any number of directions in the event of a crash. First, the handlebars 20 will move along with the fork 107 as fork 107 pivots relative to frame 102. Second, given the design of the clamps 10, at least eight different motions can be imparted independently to each of the handlebars 20 in the event of a crash. The clamps 10 can rotate in either a clockwise or counterclockwise direction as shown by arrows 50 around fork tubes 140 and 142. The clamps 10 can also move up or down on fork tubes 140, 142 as shown by arrows 54. The handlebars 20 can rotate in either a clockwise or counterclockwise direction as shown by arrows 52 around clamp 10 and the handlebars 20 can move up or down in clamps 10 as shown by arrows 51.

The construction of the handlebars 20 is easily understood from the drawings. Each handlebar 20 has a column 22 and a handgrip portion 24 projecting from the column 22 at an angle 23. Alternatively, the handlebar 20 may be made from a tube having been bent to form a curved section between the column 20 and the hand grip portion 24.

The clamps 10 each have three distinct portions. First, each has a split ring portion 12 having an opening 14 such that split ring portion 12 can receive and surround one of the fork tubes 140 or 142. Second, each has a split ring portion 11 having an opening 13 such that the split ring portion 11 can receive and surround the column 22 of handlebar 20. Third, each has a connection portion 15 joining the two split ring portions 11 and 12.

FIG. 2 shows a clamp for an adjustable motorcycle handlebar 10 shown installed on a motorcycle fork tube 140. A handlebar 20 is adjustably attached to the clamp 10 for an adjustable motorcycle handlebar 20.

Clamp 10 has a split ring portion 12 for adjustably engaging one of the fork tubes 140, 142 of the motorcycle 100, a connecting portion 15 and a split ring portion 11 for adjustably engaging handlebar 20.

The clamp 10 can be rotated on fork tube 140 or 142 as shown by arrows 50 to adjust the position of the split ring for the handlebar 20 to a desired position to support the handlebar 20. In order to rotate the clamp 10 the split ring 12 is loosened by turning bolt 34 until gap 14 is large enough to rotate the split ring 12 on fork tube 40. When split ring 11 is in the desired position bolt 34 is tightened until the split ring 12 grips the fork tube 140 such that clamp 10 is prevented from rotating in the directions shown by arrows 50. In a similar fashion handlebar 20 can be raised or lowered on column 22 to adjust the height of the handlebar 20 as shown by arrows 51 and to rotate the handlebar as shown by arrows 52 to adjust the position of the handlebar 20 to the desired position which will make it easier and more comfortable for the rider to operate the motorcycle. When the handlebar 20 is in position bolt 34 in split ring 11 is tightened to grip column 22 of handlebar 20. In this manner the handlebars 20 can be added to the motorcycle 100 without taking off the windscreen 156 or the cowl 152 since the clamp 10 is of small height and length and can be attached to the fork tube 140 or 142 without interfering with the cowl 152 or the windscreen 156. Similarly the handlebar 20 can be attached to the clamp 10 by swiveling the clamp into a position whereby the handlebar 20 can be inserted into the aperture 111 in split ring portion 11 and rotated as shown by arrows 52 and raised or lowered as shown by arrows 51 to the desired position, which can be extended out of the cowling as a sports bike or raised and rotated toward the rider inside the cowling 152 and windscreen 156 to provide a touring bike style handlebar position. The raising or lowering and rotating of the handlebars 20 can be accomplished to fit the contours of the cowling 152 and windscreen 156 so there is no interference.

With the handlebars 20 down and rotated to extend outward the handlebars are in the sports bike position.

With the handlebars 20 raised and rotated toward the handlebars 20 are in the touring bike position, which is more comfortable for the rider.

Figure 3:
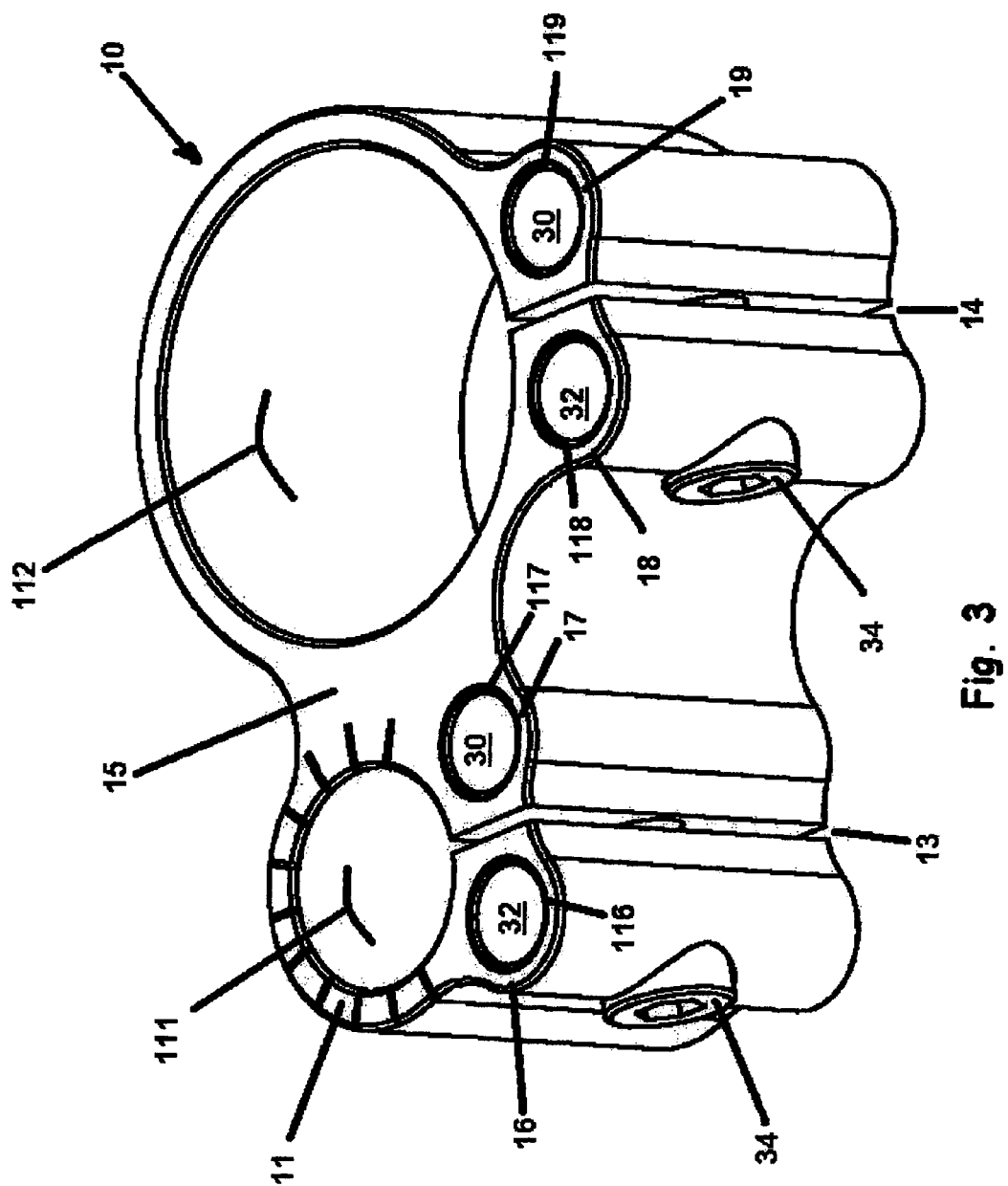
FIG. 3 is a top rear perspective view of the clamp for a motorcycle handlebar.

The detailed construction of the clamp 10 is shown in FIG. 3. Clamp 10 has a split ring 12 for engaging either fork tube 140 or 142 on the front wheel 105 of the motorcycle 100. When the sports bike style handlebar 120 is removed and clamp 10 is attached in its place for allowing the conversion of the sports bike to a standard upright ridden touring style motorcycle when desired. Aperture 112 is slid onto the top of fork tube 140 or 142 when gap 14 is wide. Bolt 34 having a hex indentation 36 in its head 37 is rotated by a hex Allen wrench to adjust the gap 14.

Split ring 12 has locking portions 18 and 19 having cylindrical apertures 118 and 119 respectively for placing posts 30, 32 therein which work in conjunction with bolt 34 to increase or decrease the gap 14 in split ring 12 which will increase or decrease the size of aperture 112 in split ring 12 for engaging or disengaging fork tube 140 or 142.

Figure 4:
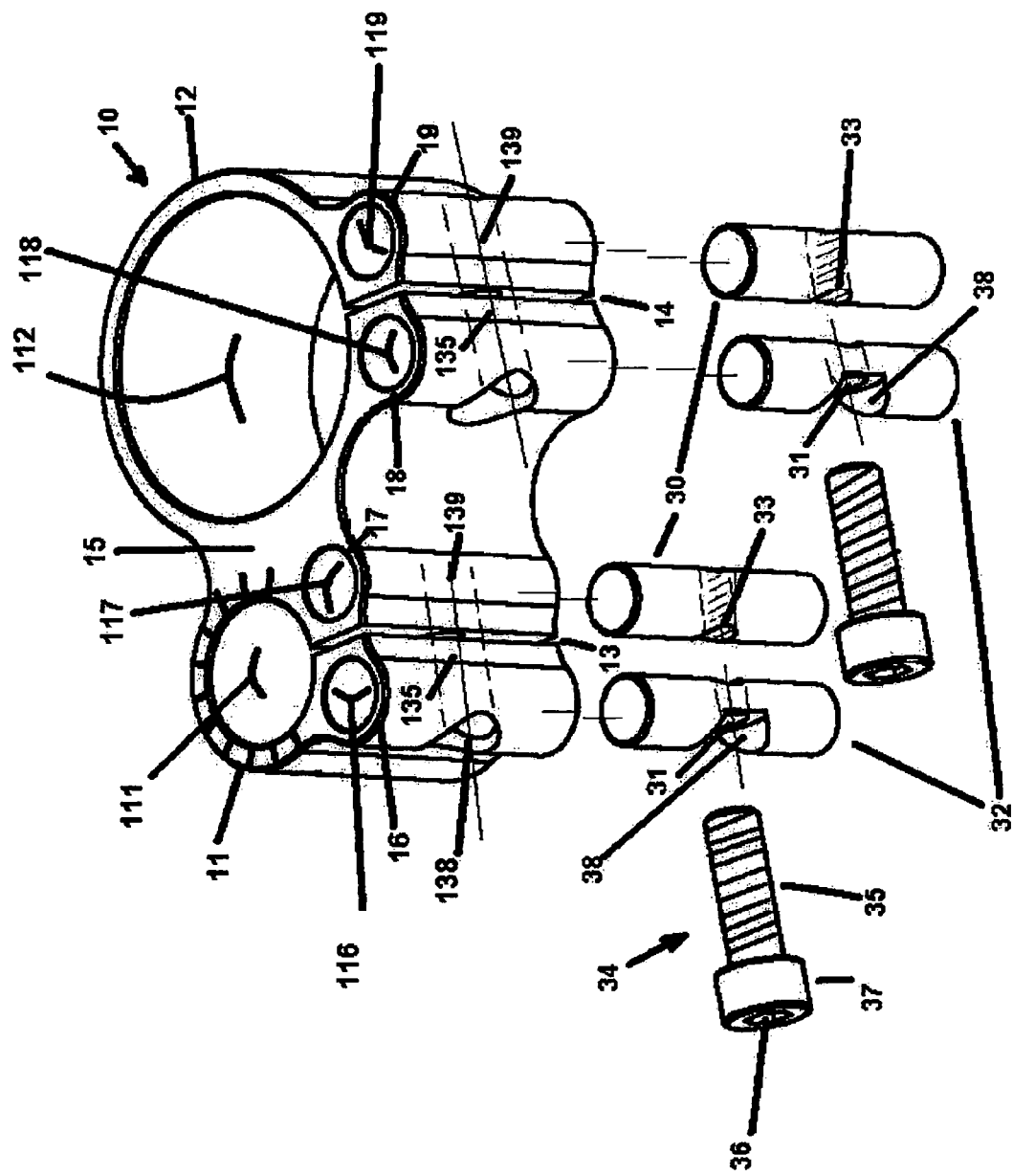
FIG. 4 is a cross section of the locking portion of the clamp for a motorcycle handlebar with the handlebar.
Figure 5:
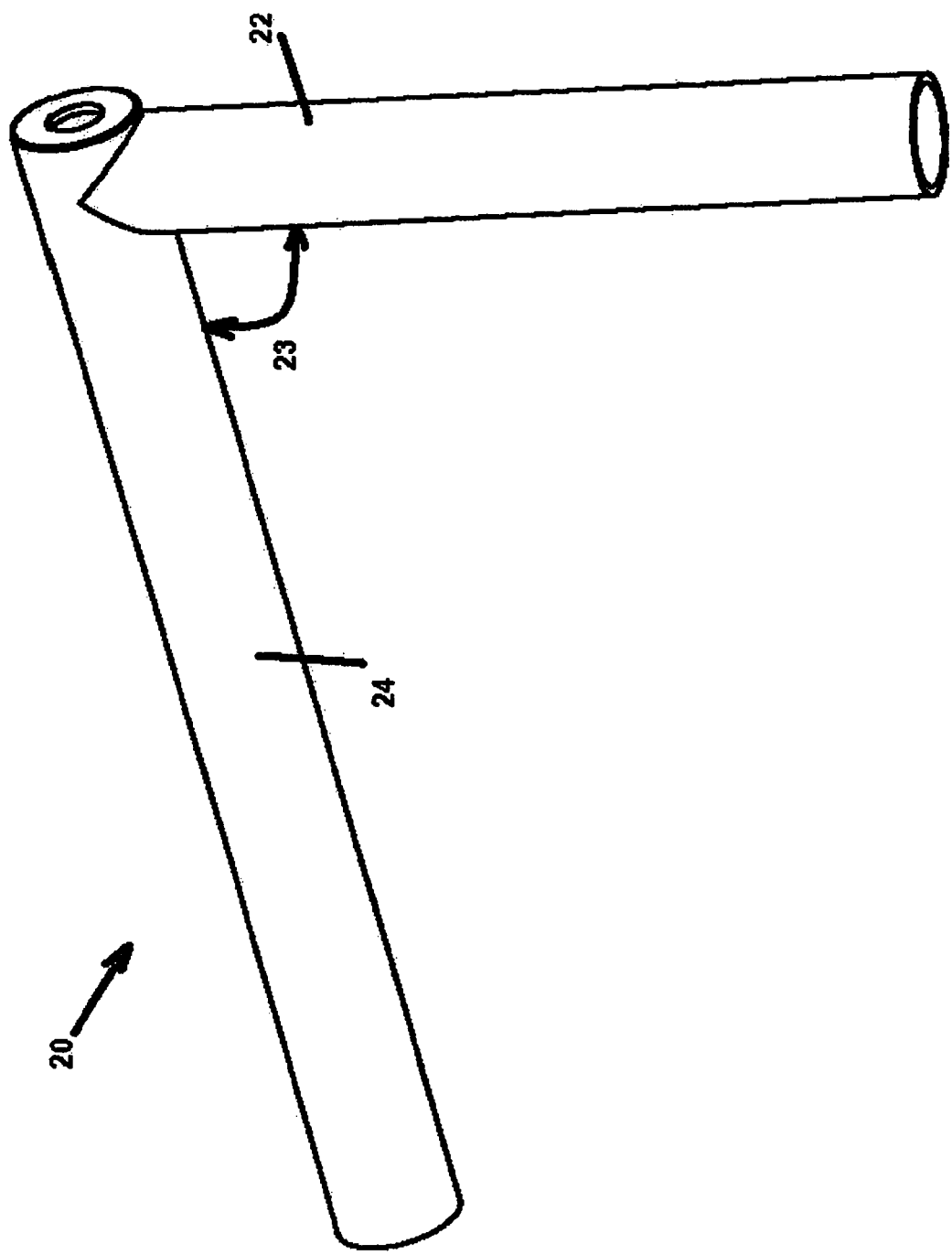
FIG. 5 is a perspective view of the handlebar.

As best seen in FIG. 4 locking portion 18 has post 32 with a portion 38 removed for allowing the head 37 of bolt 34 to engage the post. Locking portion 18 has a portion 138 removed to allow the head 37 of bolt 34 to pass through to engage post 32. An aperture 31 through post 32 allows the threaded portion 35 of the bolt 34 to pass therethrough without engaging post 32. Bolt 34 then passes through aperture 135 in locking portion 18 and gap 14 before entering aperture 139 in locking portion 19, which is aligned with the aperture 135 in locking portion 18. The threaded portion 35 of bolt 34 then enters the threaded aperture 33 in post 30 in the cylindrical aperture 119 of locking portion 19 for engaging post 30 in the cylindrical aperture 119 of locking portion 19 and drawing it toward or pushing it away from locking portion 18 thus opening or closing gap 14 to tighten or loosen aperture 112 around fork tube 140, 142. In this manner the clamp 10 is easily placed on or removed from the fork tube 140, 142 or its position adjusted thereon.

Similarly locking portion 11 has locking portions 16 and 17. Within locking portion 16 there is a post 32 with a portion 38 removed for allowing the head 37 of bolt 34 to engage post 32. Locking portion 16 has a portion 138 removed to allow the head 37 of bolt 34 to pass through to post 32. An aperture 31 through post 32 allows the threaded portion 35 of bolt 34 to pass therethrough without engaging post 32. Bolt 34 then passes through aperture 135 in locking portion 16 and gap 13 before entering aperture 139 in locking portion 17, which is aligned with the aperture 135 in locking portion 16. The threaded portion 35 of bolt 34 then enters the threaded aperture 33 in post 30 in the cylindrical aperture 117 of locking portion 17 for engaging post 30 in the cylindrical aperture 117 of locking portion 17 and drawing it toward or pushing it away thus opening or closing gap 13 to tighten or loosen aperture 111 around the column 22 on handlebar 20. In this manner the handlebar 20 is easily placed on or removed from the clamp 10 or its position adjusted therein.

When handlebars 20 are installed handgrips, brakes, clutches, accelerators, turn signals, or other controls may be added to the handlebars hand grip portion 24. The handlebars 20 can be adjusted such that the handlebars do not interfere with the motorcycles control panel, windscreen, fuel tanks or other structures on the frame.

The clamp 10 is preferably made of aluminum for low weight and strength. Similarly the handlebars 20 are preferably made from aluminum tubing for low weight and high strength.

With the clamp 10 and handlebar 20 installed on a sport bike the rider can easily adjust the hand-gripping portion 24 of the handlebars 20 from the sports bike position to a position closer to the seat of the sport bike so that the handlebars are in easy reach without the rider having to bend forward. This allows the rider to sit upright for a more comfortable ride. It also allows the rider to have his head in an upright position for better viewing of the road and traffic conditions. Further by sitting upright the riders weight is shifted so that he does not have to support himself by gripping the handgrip portion 24 of the handlebars, which is more comfortable and safer as the arms of the rider are used only to turn the handlebars rather than to support the rider and turn the handlebars.

The handgrip portion 24 of the handlebars are long enough to support the controls of the motorcycle without them being so crowed together that access is difficult.

Although the embodiments shown are for a motorcycle any vehicle having handlebars may benefit from use of the invention.

Obviously, many modifications and variations of the present invention are possible in light of the above teachings. It is therefore to be understood that, within the scope of the appended claims, the invention may be practiced otherwise than as specifically described.

What is claimed is:

1. A clamp and handlebar assembly for a motorcycle, the assembly comprising:
   one clamp for each of two fork tubes of the motorcycle, each clamp having,
   a first split ring with a first diameter for engaging a respective fork tube on the motorcycle, a second split ring with a second diameter, engaging a substantially L-shaped handlebar, the second split ring adjacent to the first split ring, the second split ring having an axis parallel to an axis of the first split ring, with the second split ring integrally connected to the first split ring, with no intervening apertures there between and the split rings having independent non coplanar parallel planar gaps,
   wherein each split ring has a respective locking portion integral therein, each locking portion having a first post aperture and a second post aperture, each of said post apertures respectively positioned on each side of the gap in the split ring, a first post having a smooth wall aperture therethrough and being positioned in the first post aperture and a second post having an aperture with a threaded wall therethrough and being positioned in the second post aperture, and a bolt extending through the locking portion apertures and the posts for engaging the threads of the second post to adjust the size of the gap,
   whereby tightening or loosening the first split ring allows installing or adjustably fixing the position of the clamp axially and radially about the fork tube and tightening or loosening the second split ring allows installing or adjustably fixing the position of the handlebar axially and radially in the second split ring.

2. A clamp and handlebar assembly for a motorcycle as in claim 1 further comprising, each L shape handlebar having a column engaging the second split ring, and a hand grip portion extending perpendicularly from the column.

3. A clamp and handlebar assembly for a motorcycle, the assembly comprising:
   two clamps with each clamp being mountable on a fork tube on each side of the motorcycle and having a first split ring with a first adjustment screw for adjustably engaging the fork tube on the motorcycle, a second split ring with a second adjustment screw, the second split ring having an axis parallel to an axis of the first split ring with the second split ring integrally connected to the first split ring, the splits in the split rings for each clamp being on separate parallel planes,
   an L-shaped handlebar for each clamp, each handlebar having a vertical column portion adjustably held in place by the second split ring, and a horizontal handgrip portion perpendicular to and extending only on one side of the column portion,
   both split rings have a respective locking portion integral with their respective split rings, the first split ring being tightened or loosened to install or adjustably fix the position of the clamp axially and radially about the fork tube on its respective side of the motorcycle, and the second split ring being tightened or loosened thereby installing or adjustably fixing the position of each handlebar axially and radially in the second split ring, whereby an infinite range of motion of each handlebar is allowed by independently moving the clamp up and down on its respective fork tube and rotating the clamp thereon, and by independently moving each handlebar up and down in its respective clamp and rotating the handlebar therein.

* * * * *